United States Patent

Mahler et al.

[11] 4,020,352
[45] Apr. 26, 1977

[54] SYSTEM FOR IRRADIATING FLOWABLE MATERIAL

[75] Inventors: Peter Mahler, Neu-Isenburg; Gerhard Frey; Gotthard Lerch, both of Bruchkobel, all of Germany

[73] Assignee: Leybold-Heraeus GmbH & Co. KG, Cologne, Germany

[22] Filed: July 10, 1975

[21] Appl. No.: 594,677

[30] Foreign Application Priority Data

July 18, 1974 Germany .......................... 2434504

[52] U.S. Cl. .............................. 250/436; 250/437
[51] Int. Cl.² ...................................... G21K 5/06
[58] Field of Search ................... 250/438, 437, 436

[56] References Cited

UNITED STATES PATENTS

| 3,602,712 | 8/1971 | Mann et al. | 250/436 |
| 3,767,918 | 10/1973 | Graybeal | 250/437 |

Primary Examiner—Alfred E. Smith
Assistant Examiner—T. N. Grigsby
Attorney, Agent, or Firm—Spencer & Kaye

[57] ABSTRACT

A system for irradiating flowable material has an irradiation chamber; inlet and outlet conduits for introducing the flowable material into and discharging it from the irradiation chamber. The latter includes a spiral passage for guiding the flowable material in a spiral path from the inlet conduit to the outlet conduit. A radiation source is supported within the irradiation chamber in the zone of the spiral passage for irradiating the material flowing therethrough.

12 Claims, 2 Drawing Figures

SYSTEM FOR IRRADIATING FLOWABLE MATERIAL

BACKGROUND OF THE INVENTION

The present invention relates to a system for irradiating flowable material, particularly sewage sludge. The system includes an insert which has at least one radiation source and which is disposed inside an irradiation chamber.

A system of this type is known from German Accepted Published Patent Application (Auslegeschrift) No. 2,208,160. This known system includes a cylindrical irradiation chamber with a likewise cylindrical insert disposed coaxially therein to divide the irradiation chamber into two coaxial compartments. The radiation sources are disposed in the wall of the cylindrical insert. With this known system the treatment of the product can be effected only in batches. For this purpose, the irradiation chamber is filled with the material which is subsequently stirred for a certain period of time with the aid of a winged screw and then discharged. Such batch-wise operation has the drawback that relatively long idle periods (fill times and discharge times), during which the radiation sources are not or at least not fully utilized, cannot be avoided. Furthermore, in this known system there is a danger that the commingled material may separate, resulting in a non-uniform irradiation. The possibility of such an occurrence cannot be completely eliminated even by reversal of the direction of rotation of the winged screw.

SUMMARY OF THE INVENTION

It is an object of the present invention to provide a system of the above-outlined type which makes possible a more efficient utilization of the radiation sources, and also effects a more uniform irradiation of the material to be treated.

This object and others to become apparent as the specification progresses, are accomplished by the invention, according to which, briefly stated, there is provided in the irradiation chamber at least one spiral channel in the zone of which at least one radiation source is provided for irradiating the product flowing through the channel.

A system constructed in the above-outlined manner can be operated continuously so that inactive (idle) periods no longer exist. Separation of the intermingled material can be avoided in a simple manner by baffle plates arranged in the channel so that uniform irradiation. i.e. as low a ratio as possible between the maximum and minimum irradiation dose, is assured.

It is advantageous to arrange the radiation sources in holding sleeves which are part of the channel walls. This avoids additional flow resistances and radiation absorption that could occur if the holding sleeves were placed in the spiral channel itself.

It is further advisable to make the insert of a section of band-shaped material which is bent into a one-way spiral with lateral cover plates. The holding sleeves for the radiation source are disposed in this section. This renders the manufacture of the insert very simple. Inserts with a plurality of channels in the form of a multiple spiral can be easily manufactured in a corresponding manner.

The product is expediently fed in by a pump with adjustable throughput so that it is possible to vary the throughput by changing the flow speed within the irradiation system. Uniform irradiation can then be attained by varying the total intensity of the radiation sources which can be effected, for example, by changing the number of radiation sources.

A further way to control the throughput speed is to rotatably arrange the insert within the irradiation chamber and to provide means for imparting rotation to the insert. This rotational movement alone may be sufficient for transporting the flowable material through the spiral channel so that a pump may be dispensed with. In such an arrangement the throughput speed can be regulated by changing the rpm of the insert.

DESCRIPTION OF THE PREFERRED EMBODIMENT

Figure 1:
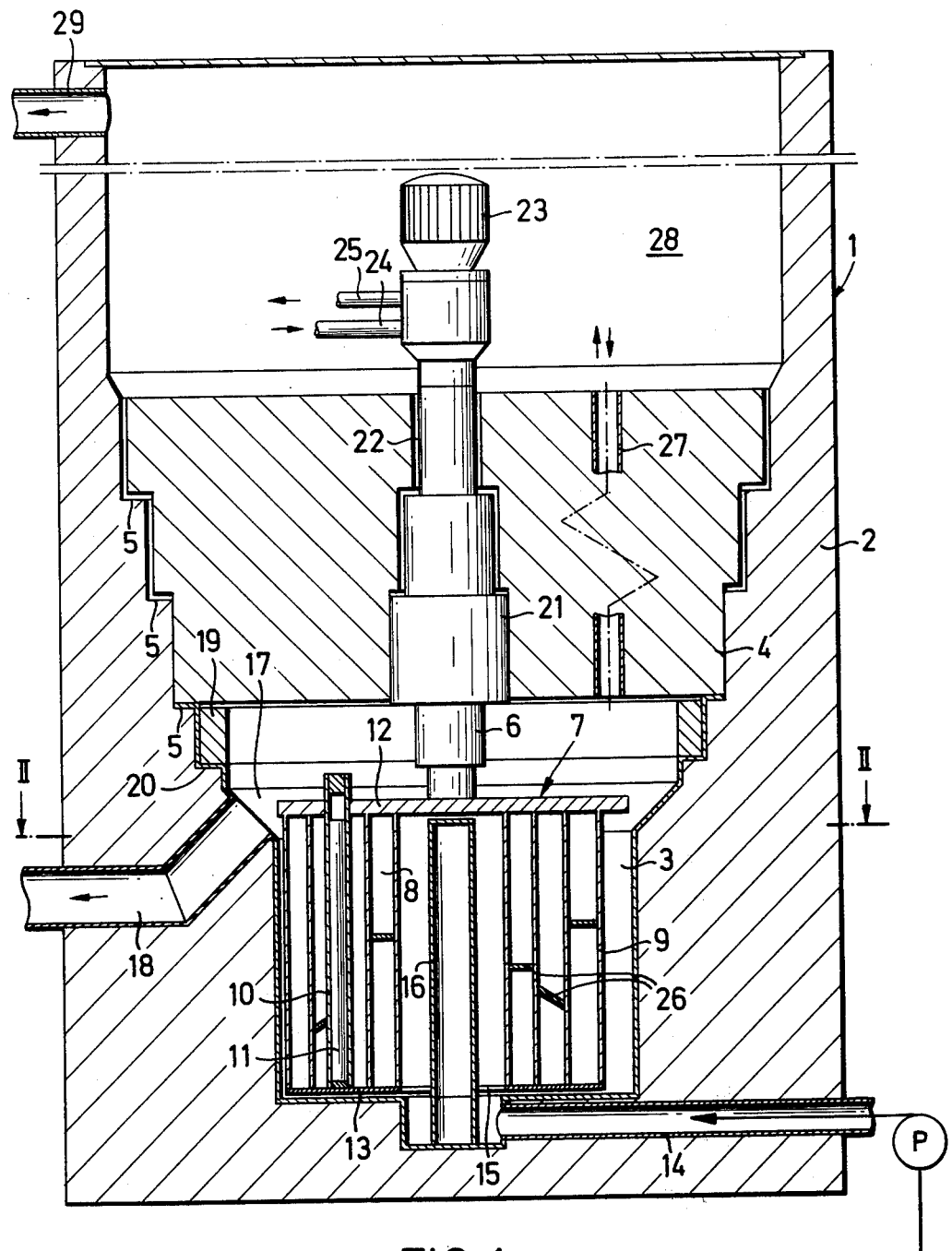
FIG. 1 is a longitudinal sectional view of a preferred embodiment of a system according to the invention.
Figure 2:
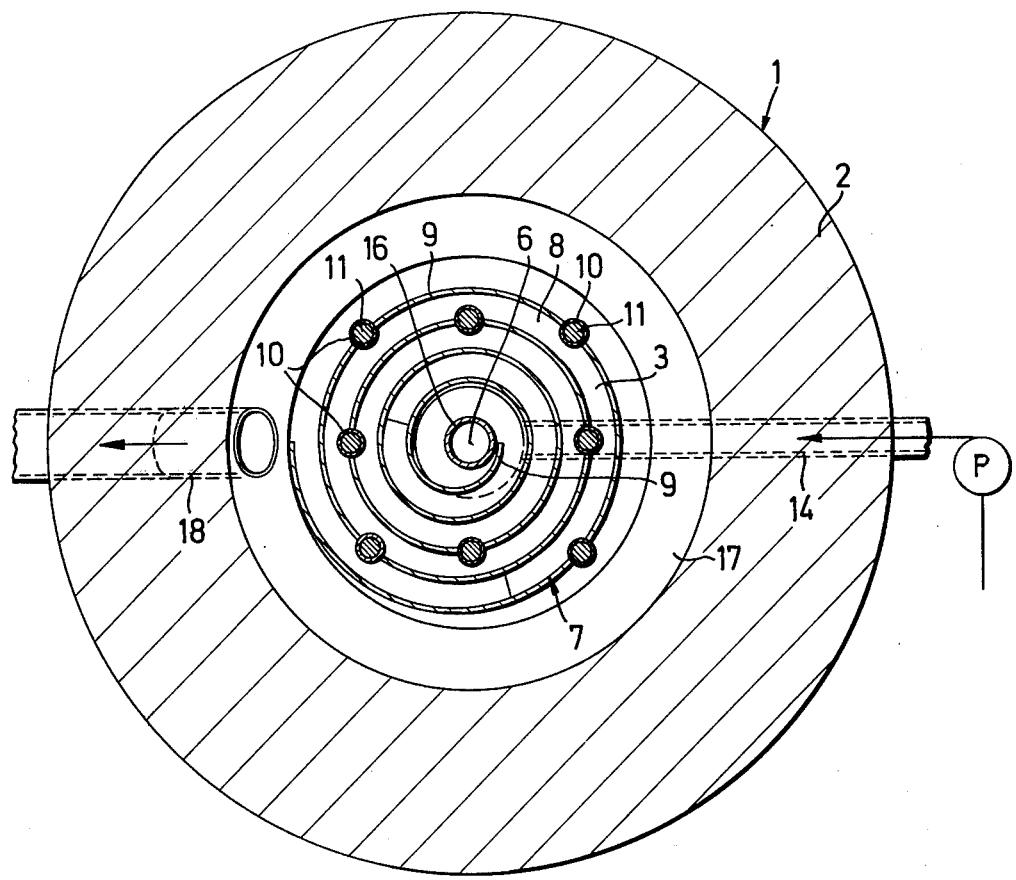
FIG. 2 is a sectional view along the line II—II of FIG. 1.

The irradiation system generally indicated at 1 in FIGS. 1 and 2 includes a concrete vessel 2 with a cylindrical irradiation chamber 3 provided therein. The irradiation chamber 3 is closed by means of a closure 4 which rests on several steps 5 of the concrete vessel 2. An insert 7 which is provided with a channel or passage 8 in the form of a one-way spiral is positioned inside the irradiation chamber 3 with its axis 6 oriented vertically. The channel 8 is defined by a wall 9 which is provided with holding sleeves 10 for the radiation sources 11. The upper and lower ends of insert 7 are formed by cover plates 12 and 13 which laterally bound the spiral channel 8. The product is fed by means of, for example, a pump through a conduit 14 into the axial region of insert 7 through an opening 15 provided in the lower cover plate 13. The center of the irradiation chamber 3 is provided with a stationary closed cylinder 16 against which rests the inner end of the spiral wall 9.

The irradiated material is discharged through an overflow channel 17 provided in the upper region of the irradiation chamber 3 from where the product is admitted to a discharge conduit 18.

The insert 7 is rotatably mounted by means of a support 19 in the form of a spoked wheel which rests on step 20 of the concrete vessel 2. This support 19 holds in its center the insert 7 and a sleeve 21 which passes through the opening 22 of the closure 4. The sleeve 21 encloses the drive shaft (not shown) for the insert 7 which is driven by the drive motor 23 disposed above closure 4. The sleeve 21 further encloses lines 24 and 25 for supplying and withdrawing coolant for the radiation sources 11. Coolant lines are known and are therefore not shown in detail. The height of the step 20 in the concrete vessel 2 is selected so that the clearance between the lower cover plate 13 and the bottom of the irradiation chamber 3 is as small as possible in order to prevent passage of the material to be irradiated. The radiation sources 11 are arranged (radially outwardly) with respect to the opening 22 in the closure 4 so that the intensity of the stray radiation escaping from the system does not exceed a harmless level.

During operation of the system the material which is fed in through line 14 continuously flows through the rotating insert 7 from the inside toward the outside and flows out through the overflow channel 17 and the discharge line 18. Transverse metal plate member 26 are provided to stabilize the insert 7 and to fix the width of the channel 8. These transverse plate members simultaneously serve as guide vanes or baffle plates for the product flowing through channel 8 so that a separation of the mixture is prevented. The radiation sources 11 are cooled during operation so that no crust formations occur in the area of the radiation sources. The throughput quantity can be varied by changing the throughput speed which can be effected, for example, by changing the number of revolutions of the insert 7 or by a pump which pumps in the product and which has a variable throughput. The intensity or number, respectively, of the radiation sources 11 must then also be varied accordingly. Since the irradiation chamber is free from dead spaces, there additionally results a good utilization of the radiation sources.

If the rod-shaped radiation sources 11 are to be replaced, the radiation chamber 3 is first rinsed with rinsing water passing through the conduits 14 and 18. Thereafter the driving motor 23 and the coolant connections 24 and 25 are removed. After shutting off the discharge line 18, the space 28 above the closure 4 fills up with water through the labyrinth-shaped equalization channel 27 provided in the closure 4 until the water level reaches the overflow 29. Thereupon the closure 4 can be removed with the aid of a crane assembly (not shown). The space previously occupied by the cover 4 is filled by more inflowing water. A cylindrical holding device for the radiation sources 11 is then placed onto the lowest step 5 of concrete vessel 2 and the radiation sources 11 are inserted thereinto under water with auxiliary tools. The empty insert 7 is then removed from the irradiation system together with the support 19 and the sleeves 21. A transporting container with new radiation sources is then inserted into the empty irradiation chamber 3. The new radiation sources are exchanged for the old radiation sources disposed in the holding device. Upon removal of the transporting container, the insert 7 is reinstalled, the radiation sources are inserted, the holding device is extracted, the closure 4 is replaced, the water is withdrawn through line 14, the cooling system 24, 25 for the radiation sources is connected and the driving motor is reinstalled, whereupon the irradiation system is ready to resume operation.

It will be understood that the above description of the present invention is susceptible to various modifications, changes and adaptations, and the same are intended to be comprehended within the meaning and range of equivalents of the appended claims.

What is claimed is:

1. A system for irradiating flowable material, including means defining an irradiation chamber; inlet and outlet conduit means for introducing the flowable material into and discharging it from the irradiation chamber; wherein the improvement comprises wall means defining a spiral passage in said irradiation chamber for guiding the flowable material in a spiral path from said inlet conduit means to said outlet conduit means; a radiation source supported within said irradiation chamber in the zone of said spiral passage for irradiating the material flowing therethrough; and a holding sleeve for accommodating said radiation source; said holding sleeve forming part of said wall means.

2. A system as defined in claim 1, wherein said wall means constitutes an insert positioned within said irradiation chamber; said wall means comprises a sheet material component bent into a single spiral formed to include said holding sleeve and lateral cover plates attached to edges of said component for closing off the sides of said spiral passage.

3. A system for irradiating flowable material, including means defining an irradiation chamber; inlet and outlet conduit means for introducing the flowable material into and discharging it from the irradiation chamber; wherein the improvement comprises wall means constituting an insert rotatably positioned within said irradiation chamber and defining a spiral passage in said irradiation chamber for guiding the flowable material in a spiral path from said inlet conduit means to said outlet conduit means; a radiation source supported within said irradiation chamber in the zone of said spiral passage for irradiating the material flowing therethrough; and means for imparting a rotary motion to said insert.

4. A system as defined in claim 3, further comprising baffle plate means positioned in said spiral passage.

5. A system as defined in claim 3, further comprising a pump of variable throughput communicating with said inlet conduit means for introducing the flowable material into said spiral passage.

6. A system defined in claim 3, further comprising means for cooling said radiation source.

7. A system as defined in claim 3, wherein said spiral passage has a central axis; said inlet conduit means opens into said spiral passage in the zone of said central axis.

8. A system as defined in claim 7, wherein said outlet conduit means communicates with that end of said spiral passage which is disposed radially outwardly from said central axis; said outlet conduit means being arranged to constitute an overflow.

9. A system as defined in claim 8, wherein said central axis is vertically oriented; said outlet conduit means opens into said irradiation chamber in the uppermost zone of said spiral passage.

10. A system as defined in claim 3, further comprising a vessel accommodating said irradiation chamber; said irradiation chamber having a generally cylindrical configuration with a vertically oriented axis; a closure member supported in said vessel for closing off said irradiation chamber at its top; said insert having a vertically oriented central axis constituting the axis of rotation of said insert; means defining a vertically oriented throughgoing opening in said closure member; said means for imparting a rotary motion to said insert including an electric motor of variable rpm support above said closure member, and a drive shaft extending through said opening and connecting said electric motor with said insert.

11. A system as defined in claim 10, wherein the radiation source is situated radially outwardly with respect to said throughgoing opening in said closure member for limiting the intensity of the radiation escaping from the system.

12. A system as defined in claim 10, further comprising means for cooling said radiation source, including coolant carrying conduits means passing through said opening in said closure member.

* * * * *